United States Patent [19]

Hehlen et al.

[11] Patent Number: 4,621,261

[45] Date of Patent: Nov. 4, 1986

[54] SYSTEM FOR MAKING A THERMO-ACTIVE DEVICE TEMPERATURE DEPENDENT

[75] Inventors: Robert Hehlen, Morangis; Philippe Marcenac, Vitry, both of France

[73] Assignee: Thomson-CSF, Paris, France

[21] Appl. No.: 563,244

[22] Filed: Dec. 19, 1983

[30] Foreign Application Priority Data

Dec. 21, 1982 [FR] France ................... 82 21404

[51] Int. Cl.$^4$ ................ H04Q 9/00; G02F 1/137; G09G 3/34
[52] U.S. Cl. .................. 340/825.52; 340/825.86; 340/785; 340/813; 350/350.5
[58] Field of Search ............ 340/825.52, 825.81, 340/785, 811, 813, 825.86; 350/331 T, 350.5

[56] References Cited

U.S. PATENT DOCUMENTS

| 3,700,933 | 10/1972 | Harkenrider et al. ........... 307/310 |
| 4,115,860 | 9/1978 | Atwater ................... 364/492 |
| 4,242,679 | 12/1980 | Morozumi et al. ............. 340/813 |
| 4,464,020 | 8/1984 | Le Berre et al. ............. 350/350.5 |
| 4,500,878 | 2/1985 | Hareng et al. ............... 340/785 |

FOREIGN PATENT DOCUMENTS 2015206 9/1979 United Kingdom .

Primary Examiner—Donald J. Yusko
Attorney, Agent, or Firm—Oblon, Fisher, Spivak, McClelland & Maier

[57] ABSTRACT

A system for making a device temperature dependent whose operation is dependent on the local heating applied to a thermo-active material layer. The invention uses the heating electrodes of the device as temperature sensors, the information detected by these sensors being stored in a memory and used as bases for establishing the temperature dependence.

10 Claims, 8 Drawing Figures

SYSTEM FOR MAKING A THERMO-ACTIVE DEVICE TEMPERATURE DEPENDENT

BACKGROUND OF THE INVENTION

1. Field of the Invention

The present invention relates to a temperature dependent electric addressing system for a device whose operation is dependent on the local heating communicated to a thermo-active material layer by an electrode. The invention applies particularly to the case of display screens with matrix control using a liquid crystal of the smectic type and a set of conducting strips heated transitorily by Joule heating.

The electrodes causing the heating of the layer of a material such as a liquid crystal are successively traversed by a pulsed and recurrent heating current. Since the operating temperature of the device is well defined according to the material used, it is clear that the electric heating power required for reaching this temperature depends greatly on the resistance of the electrode and its variation with the temperature. Although it is relatively easy to control this power as a function of the ambient temperature, it is much more difficult to take into account the local temperatures inside the device. Depending on the type of use, considerable gradients appear from one electrode to another. So as to supply the electrode concerned with the required energy sufficient to accomplish the thermal cycle imposed by the characteristics of the thermo-active material, it is advantageous to make the device temperature dependent by taking into account the particularities of the resistance electrodes.

2. Description of the Prior Art

It is known to make such devices heat dependent by using a microprocessor. Since the current in the electrode results from the application of a voltage pulse of amplitude V and duration T, the power supplied for heating an electrode may be modulated by acting on the duration T and keeping the amplitude V fixed. The microprocessor manages a read only memory containing the networks of "pulse width as a function of the temperature" curves. The microprocessor takes into account the address of the electrode and its previous excitation conditions: number of times that the electrode has been acted on in a given period of time, time since the last action etc.

From this data it will call up from the memory the suitable pulse width. The drawback of this method is that it requires management by means of fixed data which does not easily take into account the real parameters and all the possibilities of use. In fact, the thermal state of the material in contact with an electrode is only known by data external to the electrode-material interface.

SUMMARY OF THE INVENTION

To palliate these drawbacks, the invention proposes a temperature dependent circuit which uses the heating electrodes as so many sensors. The use of the electrodes as sensors is based in the property which most conducting materials possess of modifying their electric resistance as a function of the temperature. It is then possible to know as precisely as possible the temperature of the heating electrode-active material interface and to supply this material with just the amount of heat required for correct operation thereof.

The invention has then as object a system for making a device dependent on the temperature whose operation depends on the local heating applied to a thermo-active material layer, said local heating being produced by a transitory electric current passing through an electrode belonging to an assembly of electrodes placed in the immediate vicinity of said layer, said system comprising a memory containing data relative to the thermal control of said electrode and means providing thermal addressing of said electrodes as a function of said data, wherein with each electrode made from a conducting material having a coefficient of temperature, a resistance r has also passing therethrough at least a part of said heating current, the potential difference v appearing at the terminals of said resistance being representative of the development of the heating and allowing, by comparison with information contained in said memory, the amount of heat required to be supplied locally during a heating and cooling cycle of said thermo-active material.

BRIEF DESCRIPTION OF THE DRAWINGS

The invention will be better understood and other advantages will appear from the following description with reference to the accompanying figures in which.

DETAILED DESCRIPTION OF THE PREFERRED EMBODIMENTS

Among the devices operating on the principle of change of state or of certain physical-chemical properties, following a change in the temperature of an active material the typical case of smectic liquid crystal display screens with matrix display has been selected.

Figure 1:
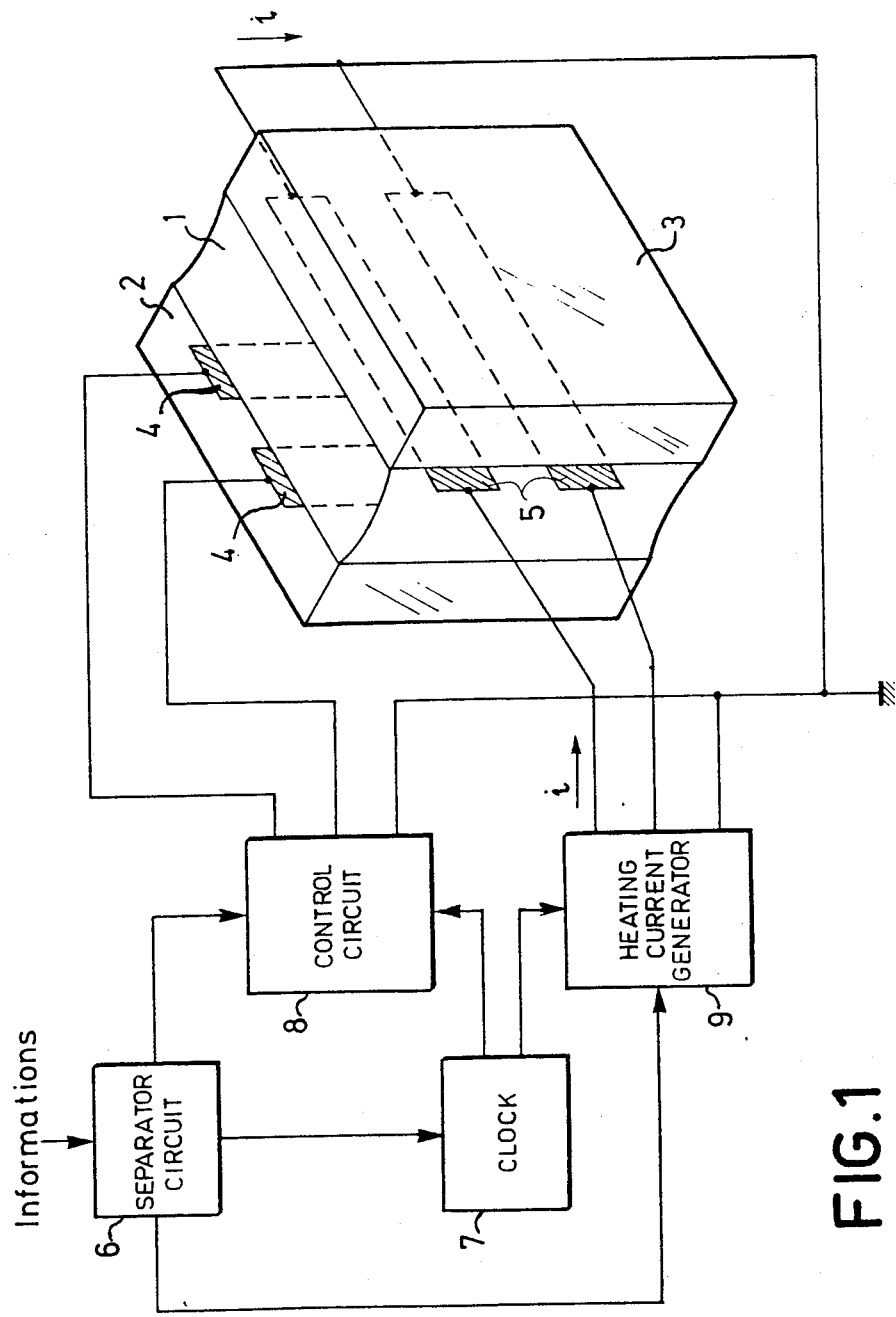
FIG. 1 shows a smectic liquid crystal display screen and the control circuit thereof.

FIG. 1 shows a smectic liquid crystal display screen of a widely used type and its control circuit. The display screen is formed by two plates 2 and 3 supporting respectively electrode networks 4 and 5 which intersect orthogonally. A liquid crystal layer 1 is inserted between plates 2 and 3 in a space of about 15 micrometers in thickness defined by shims not shown. In this example, electrodes 5 which are the lines connections of the display matrix are also the heating electrodes for the screen. The electrodes 4 represent the columns connections of the matrix. So as not to complicate the figure, only two lines and two columns of the screen have been shown. The incident electric signal, representative of the information, (characters or image to be displayed), is first of all received by a circuit 6 which separates the signals assigned to the lines from those assigned to the columns. The signals for applying the electric fields to each element of the screen defined by the intersection of a line and a column, are sent to a column control circuit 8 which has a buffer memory. The signals corresponding to the control of the heating current i which passes successively through each line connection are directed to circuit 9. A clock 7 provides coordination of the electric control signals by its action on circuits 8 and 9 depending on the operations effected by the separator circuit 6.

Plates 2 and 3 are made from glass and have a thickness, for example, between 1.5 and 3 mm. For a screen operating by reflection, electrodes 5 may be made from aluminium so as to reflect the incident light, and electrodes 4 from a conducting and transparent material such as mixed indium and tin oxide. The smectic liquid crystal layer is for example a mixture of biphenyls such as

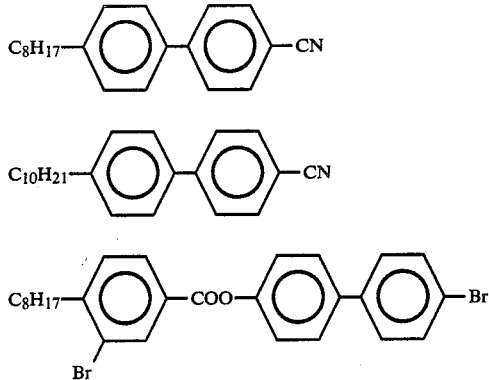

which has the following phase transitions:

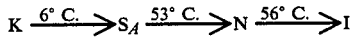

Display screens of the above-described type usually have an area of 10×10 cm and a matrix network of 256 lines for 400 columns. The mean temperature of the screen in operation is of the order of 30° C. Since the thermal time constants of the cell do not allow instantaneous evacuation of the heat, the average temperature of a line depends on the number of times that it has been heated in a finite space of time. This is what appears during operation in interactive mode where simply a few lines of the matrix are swept with a recurrence which may be of 0.5 second instead of 2.5, as it is generally the case when the screen is used as a whole.

Figure 2:
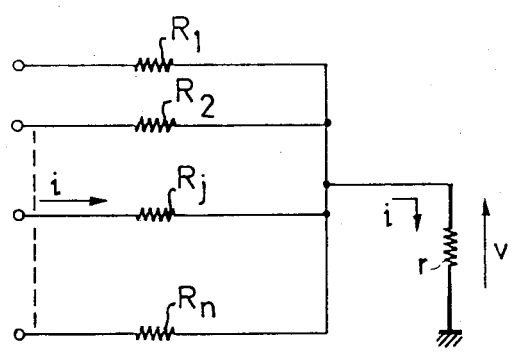
FIGS. 2 and 3 are electric explanatory diagrams of the invention.

It will be noted in FIG. 1 that the heating electrodes 5 all have one end connected to ground. So as to detect the variation in resistance of the line electrodes depending on the temperature, the invention proposes associating a resistance r in the circuit of the electrodes 5, as shown in FIG. 2 where r is placed in series. In this figure $R_1, R_2 \ldots R_j \ldots R_n$ represent the resistances of the line electrodes of the screen described above. r is chosen much smaller than the resistances of the line electrodes which have a temperature coefficient $\alpha$. In the case of aluminium electrodes, the coefficient $\alpha = [(dR)/(R \cdot d\theta)]$ is positive and of the order of $3.10^{-3}$ per degree centigrade (dR represents the variation of the resistance R for a temperature variation $d\theta$). The current i in r and the voltage v at its terminals are dependent on the value of the resistances $R_j$ at temperature $\theta$:

$$(R_j)_\theta = Ro(1 + \alpha\theta)$$

Ro being the resistance of a line electrode which has theoretically the same value as the other line resistances. It is then possible to relate the information v to the temperature of the line.

Figure 3:
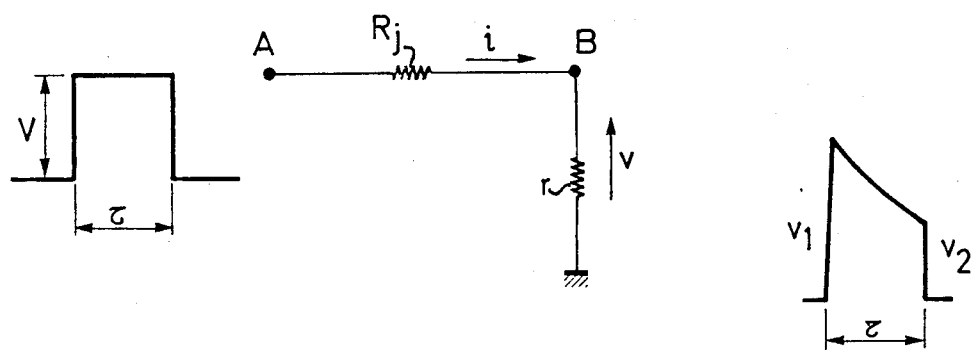

FIG. 3 is an explanatory figure of the voltages present at the ends of a line electrode when a voltage pulse of amplitude V and width $\tau$ is applied to a heating electrode of resistance $R_j$. The voltage v which then appears at the terminals of the resistance r is:

$$v = \frac{r \cdot V}{Ro(1 + \alpha\theta)}$$

Voltage $v_1$ for an "ambient" temperature $\theta_1$ (inside the screen is:

$$v_1 = \frac{r \cdot V}{Ro(1 + \alpha\theta_1)}$$

at the beginning of the application of the voltage pulse. At the end of this pulse, the value of the resistance $R_j$ has increased with the temperature which is then $\theta_2$ At the end of the application of the voltage pulse, $$v_2 = \frac{r \cdot V}{Ro(1 + \alpha\theta_2)}$$

is less than $v_1 \cdot \theta_2$ is the reference temperature which is at least equal to the isotropy temperature of the liquid crystal. In practice, $\theta_2$ will be taken greater by 2° or 3° C. than the isotropy temperature. The resistance of the heating electrodes for a screen such as the one described above is of the order of 30 ohms, the resistance r of the order of 1 ohm and the heating current i about 1A.

There further exists a dispersion of the values of the resistances of the heating electrodes. In fact, there exists, by construction, an inhomogeneity of the values due to the differences in thickness and in width of the electrodes. The resistances of the heating electrodes are then known within 10%. The voltage $v_2$, representative of the reference temperature, then has a value proper to each heating electrode.

If the value $v_2$ proper to each line is stored during a sweep satisfactory from the point of view of contrast of the display, the heating pulse may reciprocally be cut off when v reaches the value of $v_2$. Thus, the width $\tau$ of the pulse for each line electrode of the matrix is made dependent on the temperature. The relatively high temperature differences which appear at the electrodes during operation, are then taken into consideration.

The correct operation of the system has been established experimentally by storing the values $v_2$ at ±1 mV, for a maximum dispersion of 100 mV. The digitalization of the information requires then 7 bits at minimum. In practice, the values of $v_2$ are 1V±50 mV.

Several constructions of the temperature dependent system are possible. A PROM memory may for example be associated with the screen, into which memory are written the pieces of information representative of all the lines: 256 pieces of information for the case considered at the rate of 8 bits (standardized value) per piece of information.

Figure 4:
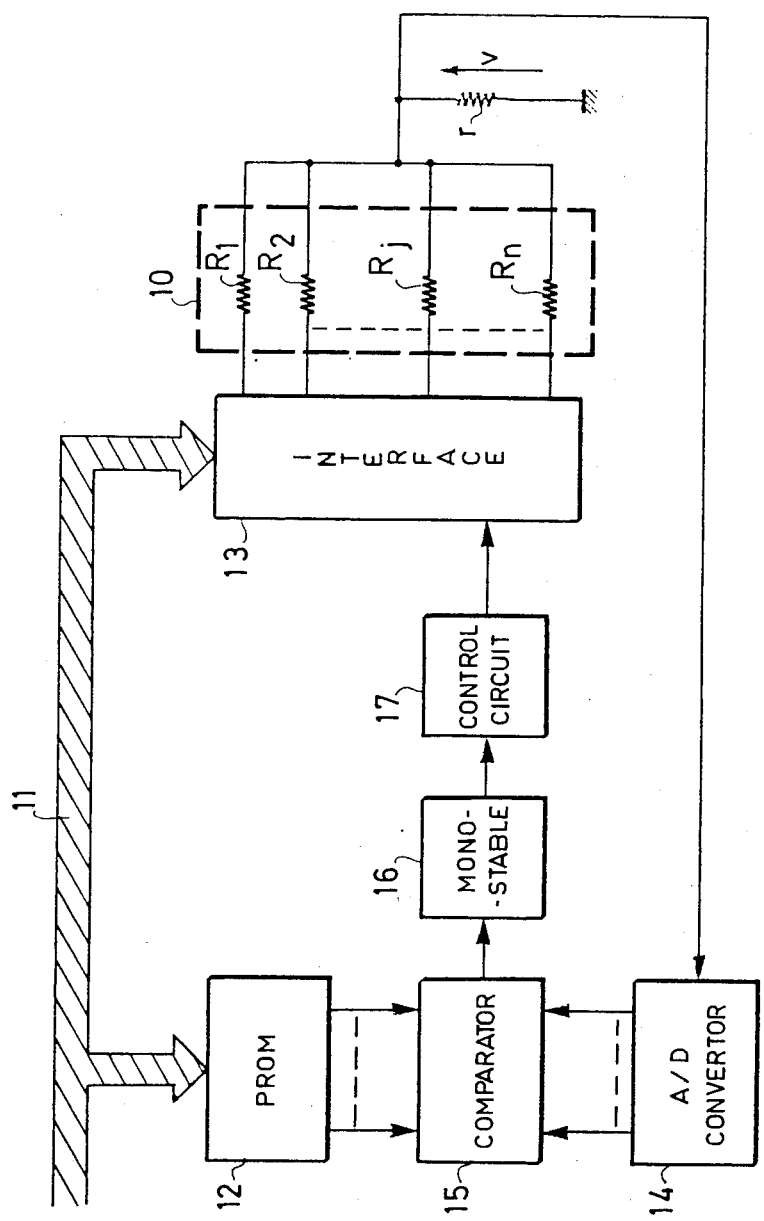
FIGS. 4 and 5 are diagrams of a temperature dependent system in accordance with the invention.

FIG. 4 is a diagram of a temperature dependent system in accordance with the invention. The assembly of heating electrodes, referenced $R_1$ to $R_n$, is defined by the broken line 10. The resistance r collects the voltage v. The system requires storage of the values $v_2$. The first operation consists then in writing into memory 12 which is a memory of the PROM type. The temperature dependent system comprises an address bus 11, a heating interface circuit 13, an analog-digital converter 14, a comparator 15, a monostable 16, a circuit 17 controlling the duration $\tau$ of the heating pulse and a memory 12. By means of the address bus, the heating electrodes are controlled one after the other. The corresponding voltage v is sent to the converter 14. When voltage v is just satisfactory, the comparator is made "transparent" for the digital information which is written into memory 12. When all the heating electrodes have been thus tested, the screen is ready for use. If it is desired to display an image or characters on the screen, the information of the choice of heating electrode is transmitted by bus 11 and triggers the heating pulse through the monostable 16 and circuit 17. The comparator 15 receives on the one hand a digital signal from memory 12 which serves as reference for the electrode being heated. It further receives a digital signal from converter 14 and representing the voltage v. When the digital values of the signals transmitted to the comparator are identical, this latter transmits a control signal to the monostable 16 which cuts off the heating pulse through circuit 17.

This system which uses a PROM memory has the drawback inherent to this type of memory, namely the impossibility of modifying values $v_2$ which have been stored. In this system, there is asociated a memory per screen. So as to be able to modify the stored values, a memory of the RAM type may be used.

Figure 5:
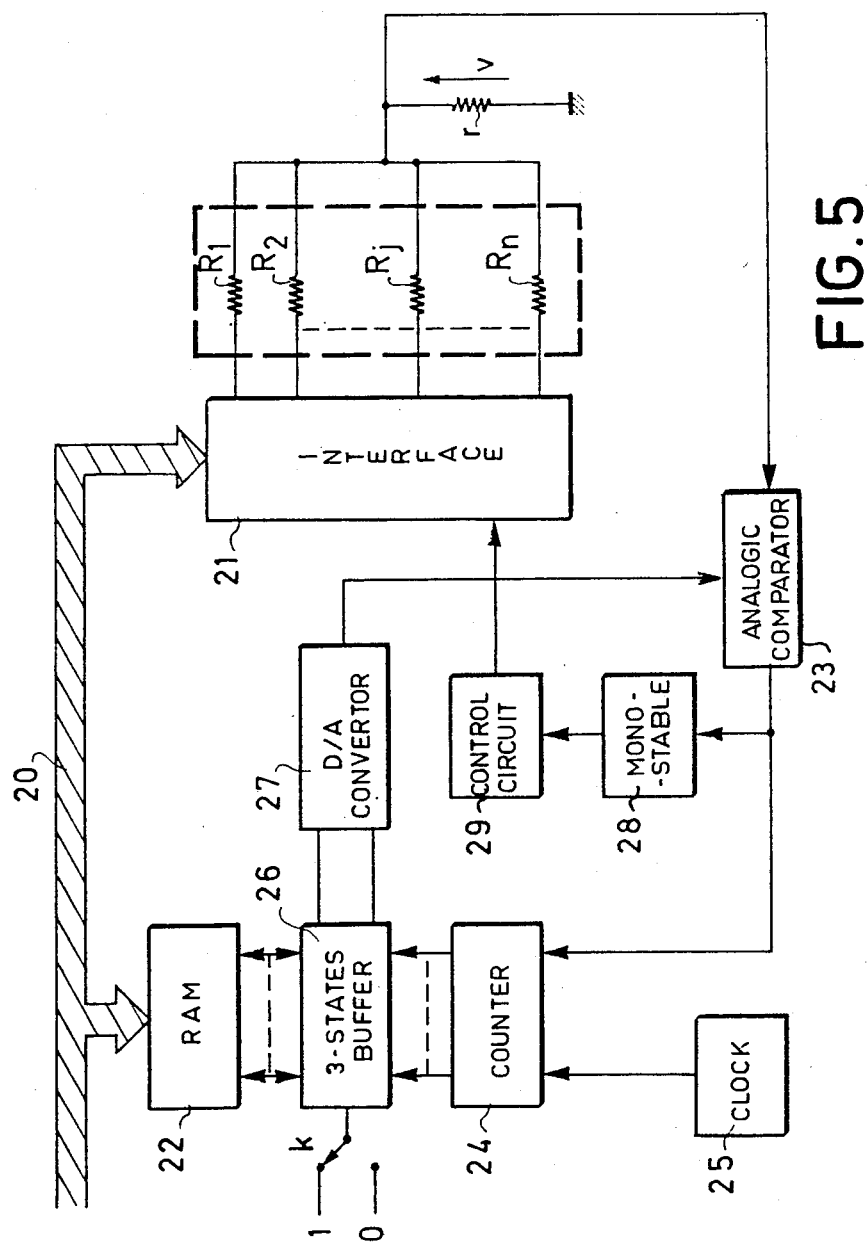

FIG. 5 is a diagram for constructing a temperature dependent system in accordance with the invention using a RAM type memory. As before, the heating electrodes are referenced $R_1$ to $R_n$. The system comprises a heating interface circuit 21 and a RAM type memory 22, which receive the line addresses through the bus 20. The system comprises first of all a phase for writing voltages $v_2$ into memory 22. For that, the voltages $v_2$ corresponding to a good contrast are sent to an analog comparator 23 which, in the write-in phase, only transmits the information to a counter 24 which counts the number of pulses which are supplied thereto by a clock 25. Counter 24 transmits a piece of information comprising 8 bits via a "THREE STATE" buffer circuit 26 which is then stored in circuit 22. The writing in operation is conditioned, for example, by a level 0 applied to the buffer circuit.

For the screen in normal display operation, the characteristic voltage v of the thermal state of a heating electrode is compared in circuit 23 to the value $v_2$ of this electrode. This value is read out from memory 22 through the buffer circuit 26, after passing through a digital-analog converter 27. Read-out from memory 22 is provided by an order given to circuit 26 (for example level 1 delivered by switch K to buffer circuit 26). As long as the two voltages compared are not equal, the heating pulse continues its action on the selected electrode. When the values of the compared signals are equal, the comparator sends a control signal to the monostable 28 which cuts off the heating pulse by means of circuit 29, (circuit controlling the duration $\tau$). The advantage of this temperature dependent system is that it may be calibrated at any time.

A more elaborate temperature dependent system consists in only taking into account the relative variations of the different values of $v_2$, namely $\Delta v_2$ for each heating electrode. This is effected by storing, during a first test of the screen, all the variations of voltage v with respect to a value taken as reference, for the same duration $\tau$ of the heating pulse. If, in a screen, an electrode is chosen having a certain resistance as reference, the dispersion of the resistances of the other electrodes is as a rule on each side of the reference resistance. In the preceding versions, information representative of the value of each heating electrode resistance was stored. In this new version, information representative of the resistance variation with respect to a resistance taken as reference will be stored.

For good understanding of the temperature dependent system, it is desirable to give an explanation in three stages. To each stage of explanation will correspond a diagram which is only a part of a general diagram.

Figure 6:
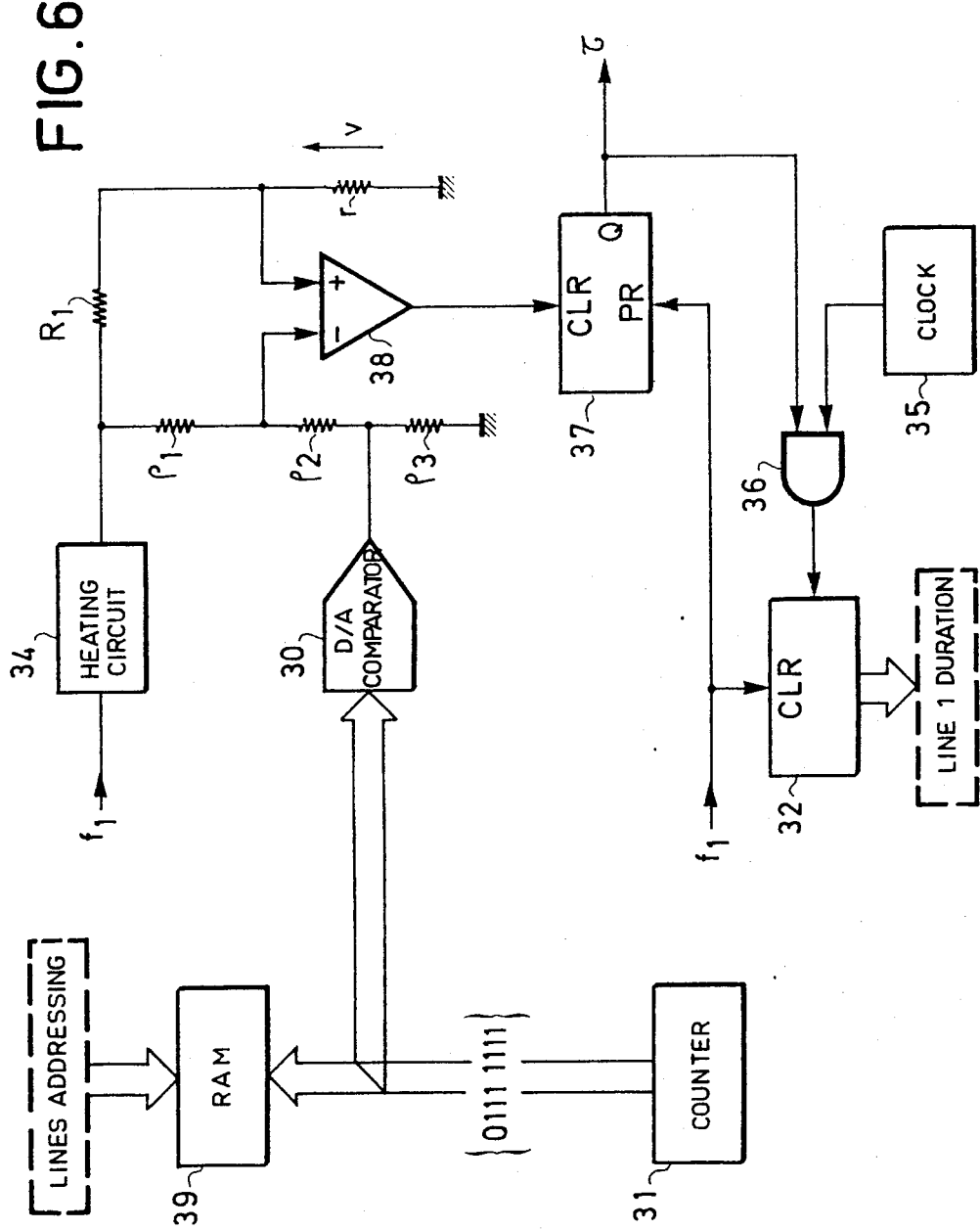
FIGS. 6 to 8 show parts of a general diagram of the temperature dependent system of the invention.

The first heating electrode is for example chosen as reference. FIG. 6 is a descriptive diagram of the addressing of a first heating electrode at the beginning of the procedure establishing dependence. The digital-analog comparator 30 is first of all set to deliver a voltage which is situated in the middle of its operating range. For that, counter 31 is loaded to its median value [0 1111111]. A pulse delivered by the line frequency sinal (heating electrode 1) $f_1$ triggers off heating of the first electrode of resistance $R_1$ through the heating circuit 34. The same pulse acts on the "clear" input (CLR) of the counter 32 which begins to count the pulses delivered by the clock 35 (of frequency 5 kHz). By its action on the "preset" (PR) input of the D flip-flop 37, the line frequency signal $f_1$ causes the output Q of flip-flop 37 to be set at state 1 and makes it possible to count the pulses delivered by clock 35 (the AND gate 36 in fact lets these pulses through). The temperature of the electrode used thus increases as well as its resistance, which causes a reduction of the voltage v at the terminals of r. After a certain time $\tau$, the differential comparator 38 triggers, because of the evolution of the voltages present at its inputs. Triggering of circuit 38 causes clearing of the Q output of flip-flop 37, by its action on the "clear" input (CLR). Circuit 32 stops counting and contains information represenative of the time $\tau$. This duration of application of the heating voltage will then be applied to all the other heating electrodes. Since the dispersion of the values of the heating electrodes about the electrode taken as reference is fairly low, the values of the other voltages v will be fairly close to the voltage found for the first electrode. The dispersion of the values to be stored in the memory RAM 39 will occur about the value corresponding to the information [0 1111111]. The resistances $\rho_1$, $\rho_2$, $\rho_3$ are calculated, as a function of the resistances $R_j$ and r, so as to obtain a duration $\tau$ considered as probable for correct operation of the screen.

Figure 7:
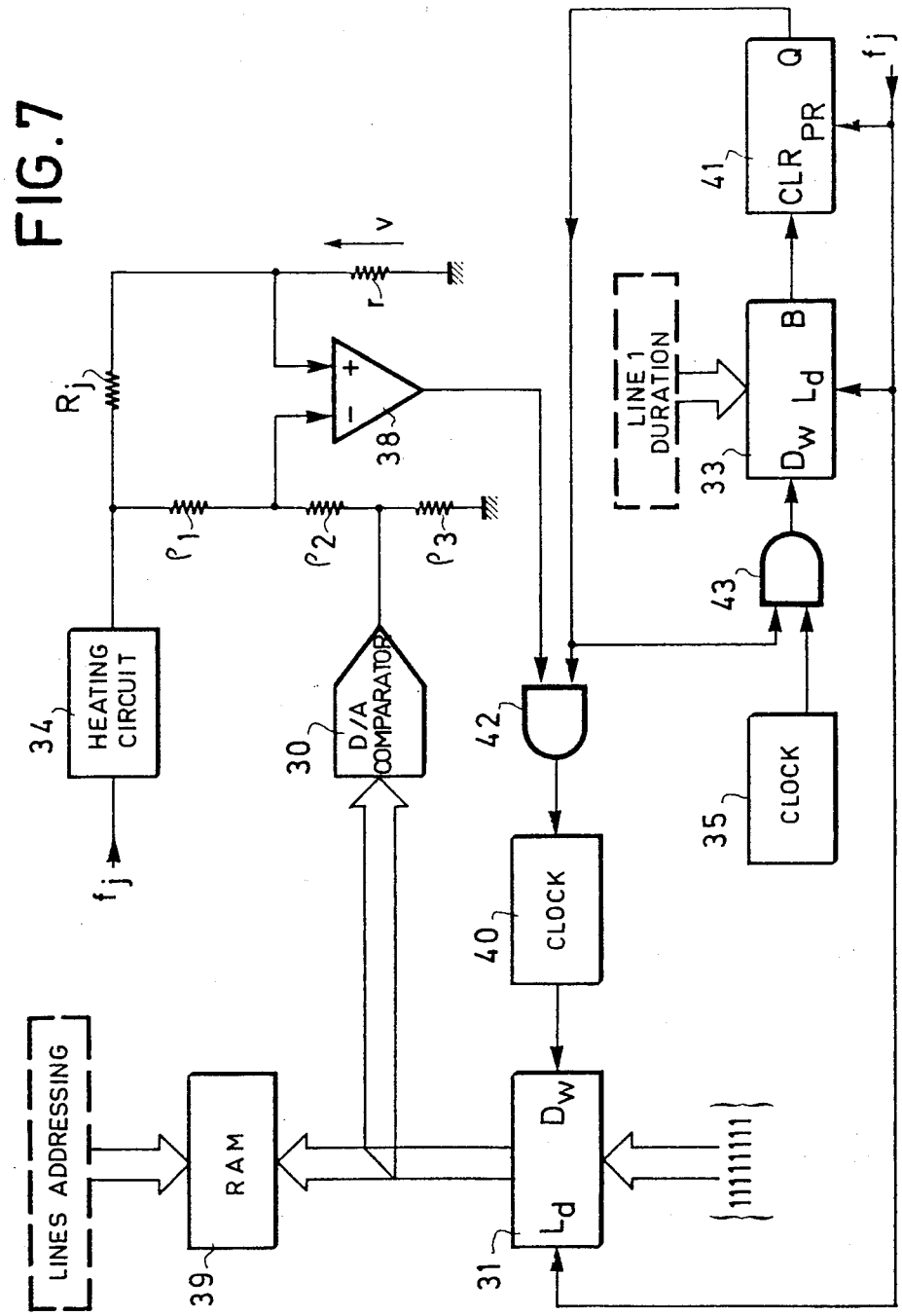

FIG. 7 is a descriptive diagram of a first addressing of the screen as a whole after addressing of the reference electrode. For each heating electrode, the heating time is initiated. Counter 33 will be loaded by the digital information corresponding to $\tau$ and coming from counter 32 which stores the time $\tau$ for the first heating electrode. To treat a heating electrode j, a line frequency signal $f_j$ acts on the following circuits:

circuit 34: heating of the line j,
D flip-flop 41: setting the Q output to state 1 by action on the PR input,
counter 33: loading of the counter by action on the input Ld,
counter 31: loading of the information [11111111] by action of the input Ld.

At the beginning of the heating procedure, with the output of circuit 38 at state 1, the output of the AND gate 42 is also at state 1. The counter 33 counts down (action on the count-down input Dw) at the timing of the clock 35 (5 kHz clock) whose pulses are transmitted by the AND gate 43. Counter 31 counts down (action on its count-down input Dw) at the timing of clock 40 (100 kHz clock). It addresses the converter 30 so as to effect the analog comparison with the voltage v which is present on r. When the down count of counter 33 is finished, its borrow output (B) sends a pulse to the "clear" input of flip-flop 41 whose Q output is reset to state 0. The output of gate 42 is reset to state 0, counter 31 stops counting down and the information present at the output of counter 31 is stored in circuit 39.

Figure 8:
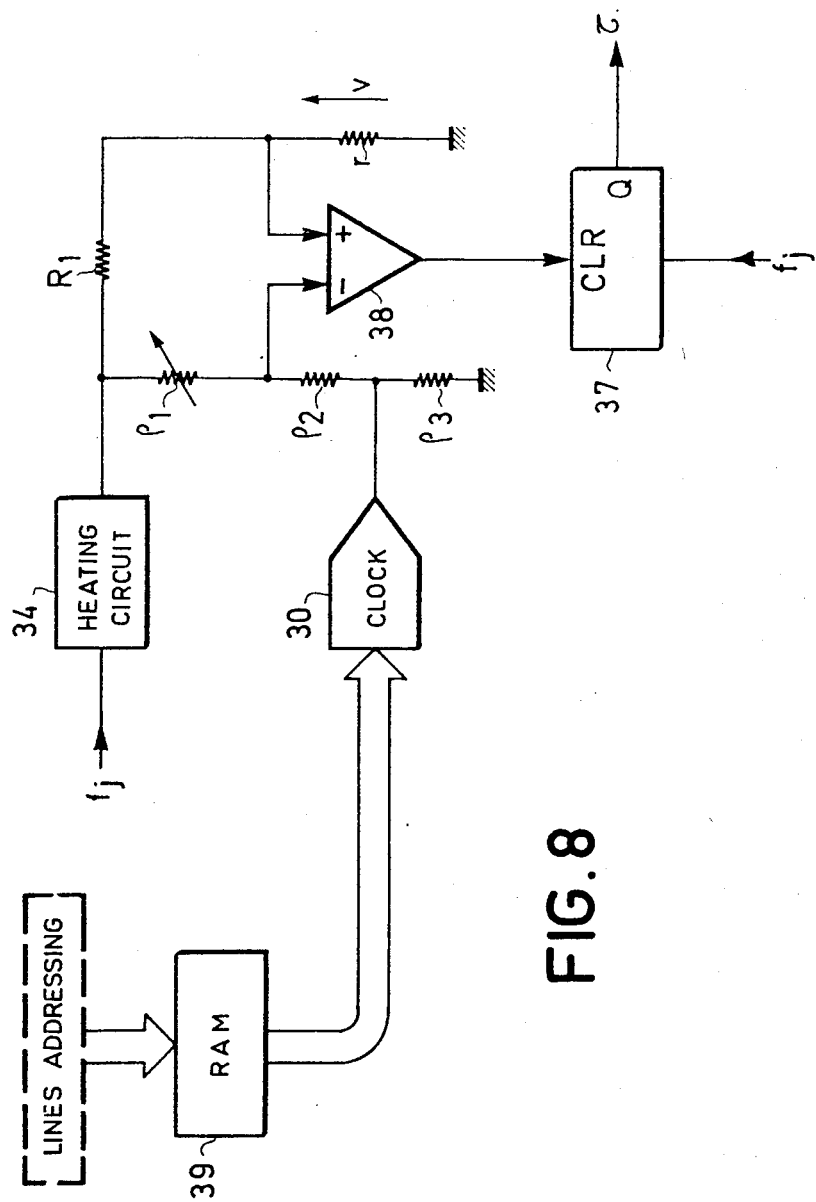

FIG. 8 is a descriptive diagram of the subsequent addressing of the screen. For each line, a line frequency signal $f_j$ initiates the heating of the electrode j and the beginning of the control of the time $\tau$ by flip-flop 37. Memory 39 supplies to the converter 30 the binary value which corresponds to the selected electrode. The output voltage of circuit 30 will serve as comparison voltage for determining the moment when the heating time is cut off. The electrodes may thus be successively addressed. It is then possible to act on the contrast of the screen by modifying the value of $\rho_1$ which will be the contrast potentiometer of the screen.

The temperature dependent system of the invention lends itself particularly well to the case of smectic liquid crystal display screens. It is advantageous to place resistance r as close as possible to the heating electrodes. It may be placed on one side of the screen adjacent the common point joining together the heating electrodes. It may be provided by depositing a metal layer on one of the edges of the screen. So as to prevent it from being influenced by the environmental temperature, a temperature stable conducting material may be used such as the one known under the registered trademark INVAR.

It comes within the scope of the invention to apply this temperature dependent system to all devices using a layer of material and which operate by local heating of this layer, the heating being caused by a current which passes through electrodes. The example given, a flat smectic screen with slow writing speed, is not limiting, the temperature dependent system may be used whatever the dimensions (flat screen, slide projection screen, etc . . . ) and whatever the writing speeds (slow or television speeds). It may be used by reflection or by transmission, or with dichroic dyes. Another example of application of the invention is the case where the material to be heated has magneto-optical properties such as those corresponding to the chemical formulae:

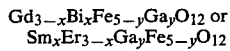

$Gd_{3-x}Bi_xFe_{5-y}Ga_yO_{12}$ or
$Sm_xEr_{3-x}Ga_yFe_{5-y}O_{12}$

The description has concerned more especially a temperature dependent system in which the heating pulse has a constant amplitude V and a variable application time $\tau$. A temperature dependent system may be designed with constant time $\tau$ and variable amplitude.

We claim:

1. A temperature-dependent addressing system comprising:
    a temperature-dependent device whose operation depends on the local heating applied to a layer of thermo-active material;
    means for producing said local heating, including an assembly of electrodes and a means for passing a transitory electric current through one of said electrodes wherein said assembly of electrodes are situated in the immediate vicinity of said layer;
    a memory means containing data pertaining to the thermal control of said electrodes;
    a means for thermally addressing said one electrode as a function of said data wherein each one of said assembly of electrodes comprises a conducting material having a temperature coefficient;
    a resistance r connected to the output of said electrode wherein at least a portion of said heating current passes through said resistance r, and whereby the potential difference v appearing at the terminals of said resistance r is proportional to the heating of said one electrode;
    an analogue-digital converter which transmits for each of said heating electrodes, said potential difference v to one of the inputs of a comparator wherein the second input of said comparator receives said data relative to the thermal control of said electrode;
    circuit means for adjusting the heating time of said electrode wherein said circuit means is connected to the output of said comparator.

2. The system as claimed in claim 1, wherein said heating electrode ($R_j$) forms part of an assembly of electrodes through which said heating current (i) passes periodically and which have a common electric point, said electric resistance r being also electrically connected to this point.

3. The system as claimed in claim 1, wherein said layer is disposed between two crossed electrode networks, one of said networks being formed by said heating electrodes.

4. The system as claimed in claim 1, wherein said material is an electro-optical material.

5. The system as claimed in claim 4, wherein said electro-optical material is a liquid crystal having a smectic phase.

6. The system as claimed in claim 5, wherein said smectic liquid crystal is a mixture of several substances.

7. The system as claimed in claim 1, wherein said material has magneto-optical properties.

8. The system as claimed in claim 1, wherein said memory is a programmable memory used for read-out.

9. The system as claimed in claim 1, wherein said memory is a random access memory, said system comprising a write-in step which may be renewed.

10. The system as claimed in claim 1, wherein said memory is a random access memory and wherein said potential difference v for each of said electrodes of said assembly are written into said memory whereby said memory contains information relative to said potential difference v present at said terminals of said resistance r for each heating electrode after said time;
    means for making said device temperature-dependent as a result of said data stored in said memory wherein said means includes a potentiometer for allowing for the overall temperature adjustment of said device.

* * * * *